United States Patent
Mestanek et al.

(10) Patent No.: US 10,478,944 B2
(45) Date of Patent: Nov. 19, 2019

(54) METHOD FOR RECYCLING ABRASIVE USED FOR HIGH PRESSURE WATERJET CUTTING FROM CUTTING SLUDGE AND AN EQUIPMENT FOR APPLICATION OF THIS METHOD

(71) Applicant: PTV, spol. s r. o., Hostivice (CZ)

(72) Inventors: Jiri Mestanek, Prague (CZ); Pavel Pokorny, Prague (CZ); Daniel Kala, Bubovice (CZ)

(73) Assignee: PTV, spol. s r. o., Hostivice (CZ)

( * ) Notice: Subject to any disclaimer, the term of this patent is extended or adjusted under 35 U.S.C. 154(b) by 296 days.

(21) Appl. No.: 15/381,111

(22) Filed: Dec. 16, 2016

(65) Prior Publication Data
US 2017/0182631 A1 Jun. 29, 2017

(30) Foreign Application Priority Data
Dec. 31, 2015 (CZ) .............................. PV 2015-961

(51) Int. Cl.
*B24C 9/00* (2006.01)
(52) U.S. Cl.
CPC .............. *B24C 9/006* (2013.01); *B24C 9/003* (2013.01); *Y02P 70/179* (2015.11)
(58) Field of Classification Search
CPC ............ B24C 9/00; B24C 9/003; B24C 9/006
USPC ................................... 451/40, 87, 88, 75, 60
See application file for complete search history.

(56) References Cited

U.S. PATENT DOCUMENTS

| 5,695,385 A * | 12/1997 | Bachand | B24C 9/006 |
| | | | 451/100 |
| 2010/0323588 A1 * | 12/2010 | Benson | B24C 9/006 |
| | | | 451/87 |

\* cited by examiner

*Primary Examiner* — Robert A Rose
(74) *Attorney, Agent, or Firm* — Luoh J. Wu; Continent Patent Office LLP (57) ABSTRACT

The recycling unit is the technology for the continuously controlled process of recycling and drying screened abrasive during which the intensity of batching of the abrasive is regulated according to the temperature in the drying oven. The control system continuously measures the current temperature and on the basis of this data it decides on switching the heating elements on or off or turning the batching process on or off; this control is based on the temperature hysteresis and on changing the intensity of batching of abrasive, which is subject to switching the heating elements or turning the batching process on or off.

14 Claims, 8 Drawing Sheets

| Time [hh:mm] | Power [kg/hour] | Production [kg] |
|---:|---:|---:|
| 00:30 | 24,9 | 12,4 |
| 01:00 | 29,3 | 14,7 |
| 01:30 | 30,6 | 15,3 |
| 02:00 | 31,9 | 15,9 |
| 02:30 | 29,6 | 14,8 |
| 03:00 | 35,7 | 17,8 |
| 03:30 | 42,5 | 21,2 |
| 04:00 | 49,8 | 24,9 |
| 04:30 | 61,5 | 30,7 |
| 05:00 | 73,2 | 36,6 |
| 05:30 | 93,7 | 46,9 |
| 06:00 | 112,9 | 56,5 |
| 06:30 | 131,7 | 65,8 |
| 07:00 | 131,9 | 66,0 |
| 07:30 | 145,4 | 72,7 |
| 08:00 | 156,3 | 78,1 |
| 08:30 | 169,2 | 84,6 |
| 09:00 | 179,5 | 89,7 |
| 09:30 | 192,8 | 96,4 |
| 10:00 | 197,2 | 98,6 |
| 10:30 | 210,2 | 105,1 |

METHOD FOR RECYCLING ABRASIVE USED FOR HIGH PRESSURE WATERJET CUTTING FROM CUTTING SLUDGE AND AN EQUIPMENT FOR APPLICATION OF THIS METHOD

This application claims the benefit of Korea application number: 10-2016-0129658 filed on Oct. 7, 2016. The content of this document and the entire disclosure of publications, patents, and patent documents mentioned herein are incorporated by reference.

AREA OF TECHNOLOGY

The equipment for recycling abrasive used directly at the waterjet user's premises

STATE OF THE ART

The unconventional high pressure waterjet technology has been for the past several decades constantly evolving, improving, developing and getting onto a high level. It can be said that it is becoming quite a common and widely used technology in the various sectors of industry. The technology for the high pressure waterjet cutting using CNC machines requires a great amount of abrasive which is relatively expensive and is imported to the Czech Republic from abroad—mainly from Australia and India. The acquisition costs of abrasive makes up to 50% of the cost of operating CNC machine.

The abrasive material is used in the abrasive waterjet (AWJ) cutting. Small particles of this material are brought to the cutting head and carried in the mixing chamber by the stream of water. The mixture of water and abrasive then falls on and cuts the relevant material. The water transmits to the abrasive a part of its kinetic energy and increases the efficiency the entire cutting process. Therefore the AWJ is used especially for cutting hard materials. The abrasive material affects the cutting process and the quality of the machined surface. This is dependent on grain's size and shape, the chemical composition and the mass flow of the abrasive material. The choice of abrasive is also determined by the hardness of the relevant material to be cut. However, this is dependent on another very important factor which is the price. The choice of abrasive material has a significant effect on the environment and also on the recycling process. According to a publication, it was reported that garnets and silica sands are not suitable for the recycling process (cf. Zdenko KRAJNÝ. Vodný lúč v praxi—WJM [Waterjet in Practice—WJM]. Bratislava: 1998. ISBN 80-8057-091-4.).

During cutting process the used abrasive remains with the turbid water and waste material in the workbench. The question then arises what can be done with the used abrasive which cannot be further used in this state for cutting. It had to be therefore disposed of as a waste material.

The company AQUAdem has developed an AQUArec PRO equipment which can be used for recycling the abrasive. The used abrasive, which passed through the whole cutting process, can be returned back to the process after its use. It was found that after recycling the abrasive does not loose its cutting capacity; that is to say, it does not become blunt. The impure, turbid water and the abrasive are removed from the cutting table by a pneumatic pump, taken to the rotary separator where the water and abrasive are separated. The turbid water is returned to the cutting table where it dissolves the settled abrasive so that it becomes easier to pump. The separated abrasive is taken into the drying oven to be completely dried up in high temperature. The abrasive is then screened in the separator and the cleaned abrasive is taken back to the storage tank.

The method used at present is not controlled, the entire process takes place randomly, which results in very low productivity of the recycling process and, consequently, the high energy consumption per unit of weight. This equipment is described in, for example, the CZ21487 Utility Model.

Another equipment for recycling abrasive is manufactured by the company PTV spol. s. r.o.; this equipment recycles the used abrasive from the hydro-abrasive process of separating the materials using the own source of heat—the electric heating. The mixture to be recycled is brought from an external storage (where it is stored, for example, in the bulk bags) or from the cutting table using the vacuum extraction head.

The equipment is provided with a separate heat source independent of the surrounding devices which include electric heating elements installed in a drying oven. During the drying process the recycled material is carried by the stream of air from the drying blower. The air entering the blower is preheated to a higher temperature by being passed through the space between the casings of the drying oven—this makes use of the part of the waste heat exhausted from the oven. The wet screening takes place at the entry to the drying oven (the main vibrating separator removing the fine waste). The dry screening takes place at the outlet of the drying oven (the output vibrating separator removing the coarse waste) and the screened recycled material is then poured into a container or a bulk bag.

The equipment has a relatively high screening capacity, processing 50-80 kg of recycled material per hour. However, it is a considerable disadvantage that the equipment needs to be continuously operated. The equipment does not have an optimised system for batching the abrasive. To prevent overfilling the oven with wet abrasive, the batching of abrasive is controlled visually, which nonetheless causes delays due to manually supplying the abrasive to the process, The abrasive material has to be manually (mechanically) raked to prevent it being sintered into bigger pieces which are then formed into a one large solid piece of abrasive material which must be then broken mechanically. Due to the high temperature the abrasive material also becomes sintered on the electric heating elements which are then quickly overheated and become thus permanently unfit for operating use as the used abrasive normally contains a high proportion of remnants of the cut materials such as, for example, plastic materials. The electric hearing elements are burnt on average every second working day. It is also common practice that this equipment is operated by up to two persons. The consequence of the necessity using the electric heating elements for heating is that the recycling equipment needs the electrical energy input to be high, 19 kW installed. In full operation the consumption is approaching the electrical energy input installed.

The equipment has a compressed air consumption of 2500-3000 litres per hour at a pressure of 6 bar; the consumption of clean water is 250-350 litres per hour. The input mixture is placed in the storage tank of the screw conveyor from which it is then consecutively delivered to a circular separator where it is rinsed with water to remove the undersize fraction (the very fine material). From this circular separator the screened recycled material is then conveyed to the drying oven where it is dried by means of electric heating elements and simultaneously aerated in the stream of compressed air from the drying blower. The speed of delivery of the wet abrasive cannot be readily adjusted and it lags behind, which causes accumulation of much larger amount of abrasive in the oven than can be effectively dried and the abrasive has to be stirred manually.

The output is 50-75 kg of dry recycled abrasive per hour, depending on the quality of the input mixture (i.e. the content of usable abrasive particles in the mixture).

The energy consumption of the equipment is quite high: 23.14 kW for warming the electric heating elements, 3×400V/50 Hz; the consumption of clean water is 10-50 litres per hour.

SUMMARY OF THE INVENTION

The above specified drawbacks of the drying/recycling process can be overcome by using a new system for recycling and drying the abrasive material.

Using the newly developed method for drying the recycled abrasive allows recycling the abrasive separately or as a part of a recycling system. The recycling system may include a sludge separating system with a separator where the suspension of abrasive sand, sludge and water is removed from the cutting table by the sludge separating unit and the material is screened to separate the oversize waste by means of, for example, the sludge separating system. The sludge separating unit is fitted with a vibrating separator which separates the suspension into two fractions: the undersize fraction (particles less than 0.1 mm) and the oversize fraction (particles greater than 0.1 mm) designated for further use, i.e. the recycled material. Waste is collected together with water into the bulk bag where the process of separating water takes place. The separated water is returned to the cutting table and the fine waste (sludge) remaining in the bulk bag is designated for disposal.

The capacity of the equipment is directly dependent on the moisture content of the recycled material and the temperature of the incoming air. It is therefore recommended to store the wet recycled material, after screening and sifting, in the bulk bags and leave them to stand for at least 3-5 days in a dry environment at a temperature higher than 5° C. to displace the excess water. This may take place, for example, in an outdoor shelter.

After the process of cutting materials with the high pressure abrasive waterjet, the used abrasive, together with the microscopic particles and the larger pieces of cut material referred to as the "cutting sludge", is settled in the trap on the cutting table on which the material is positioned before cure cutting.

The recycling procedure is divided into two time-independent processes. The process of screening the cutting sludge (cf. FIGS. 4 and 5) and the process of drying the reusable abrasive (cf. FIGS. 1-3).

Figure 4:
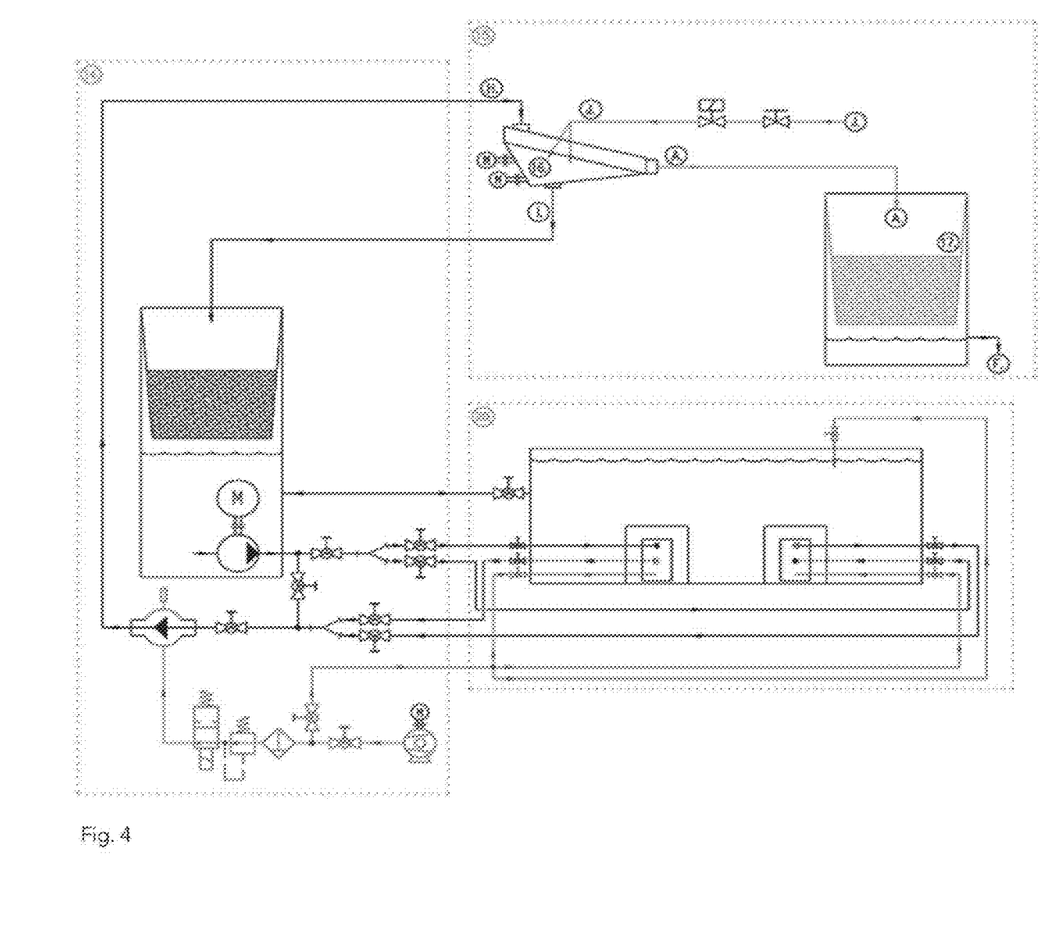
Figure 5:
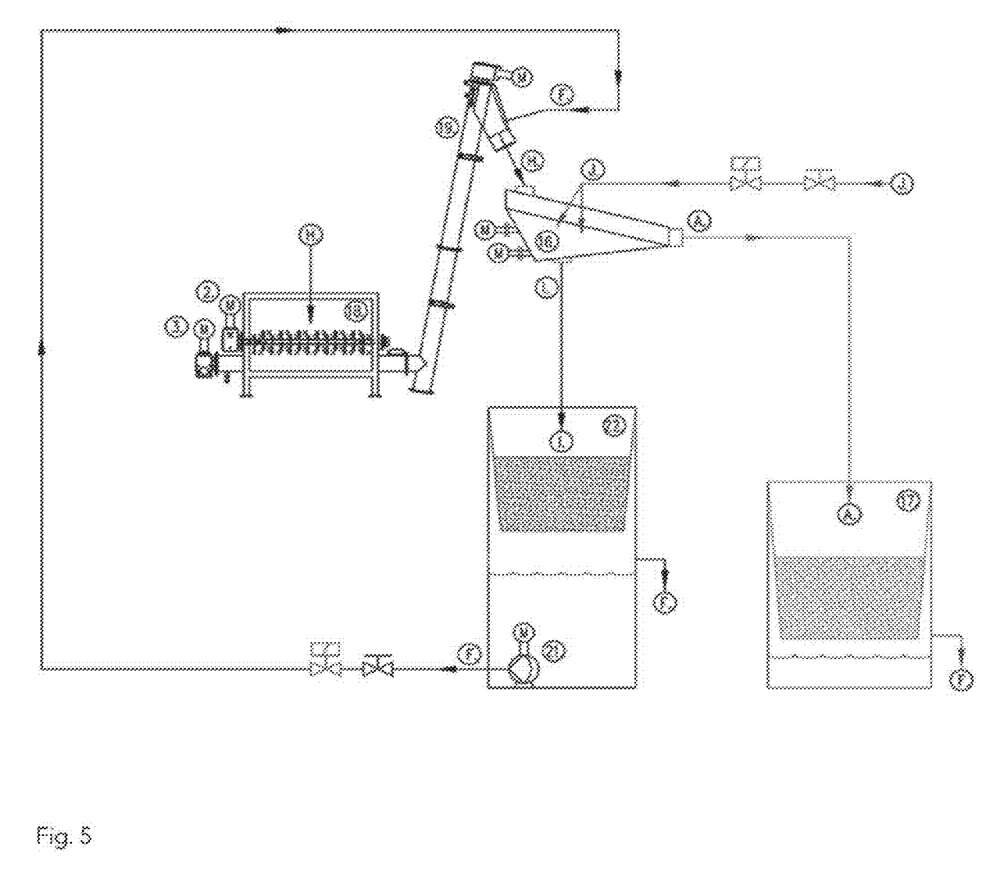
Figure 6:
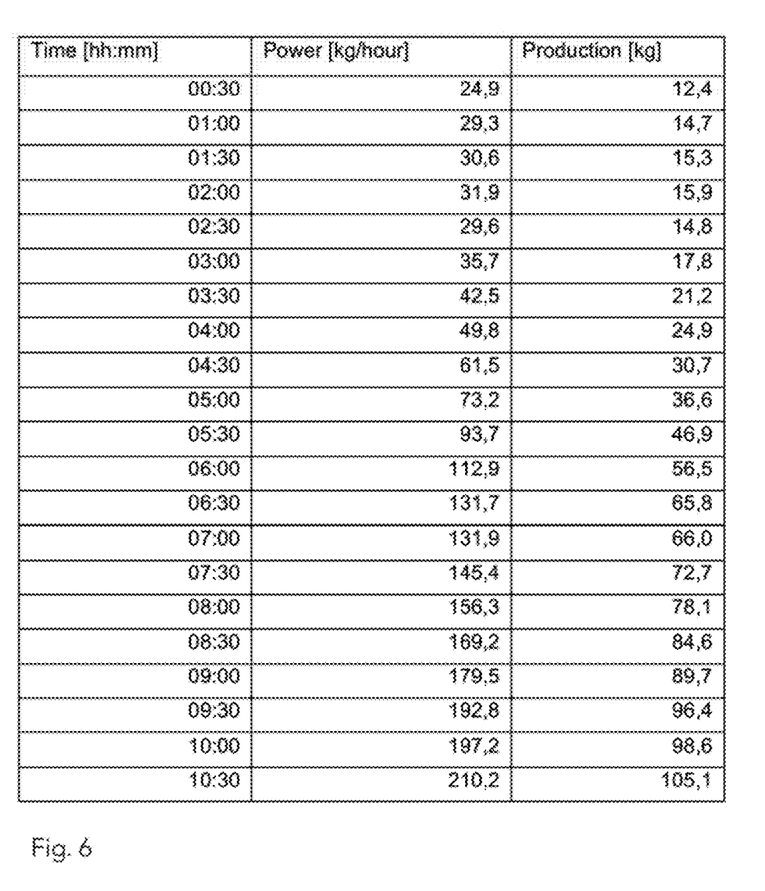
Figure 7:
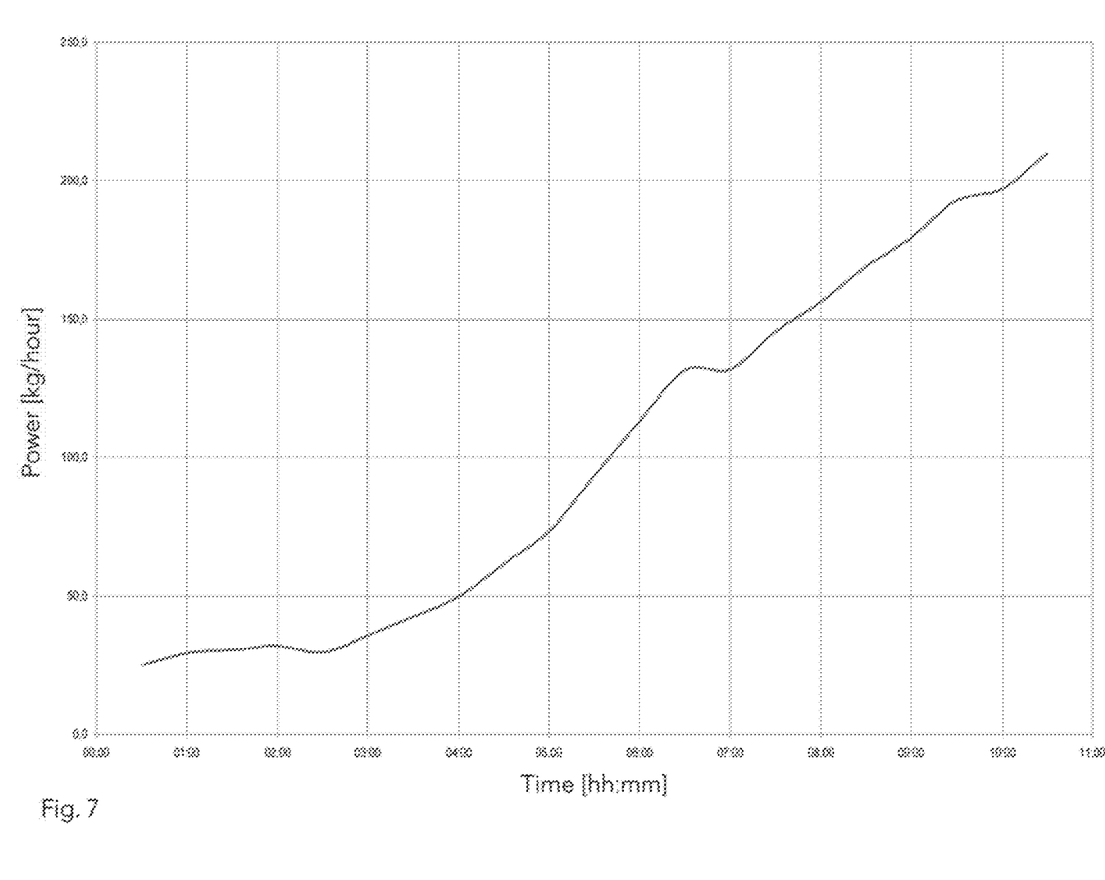
Figure 8:
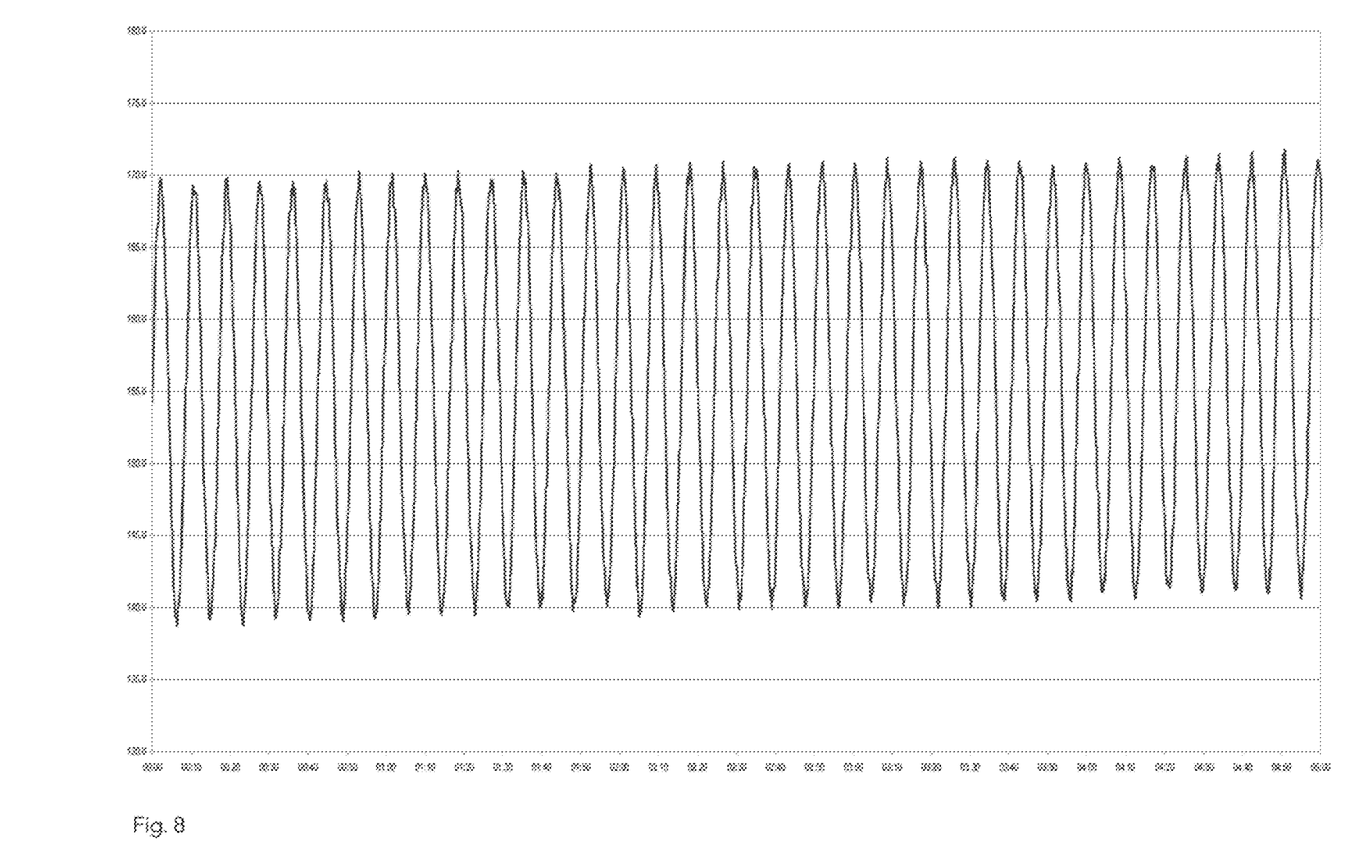

The process of separating cutting sludge (FIGS. 4 and 5) is as follows:

From the trap on the cutting table, the cutting sludge is removed by means of a pumping unit or other mechanical unit to convey the mixture (for example, a screw conveyor, a steel conveyor belt, etc.) and taken to a screening unit which consists of a vibrating separator with steel screens or screens made from other materials of suitable mesh size depending on the required size of abrasive fraction which we want to obtain. The screening unit will divide the cutting sludge into the following groups:
  a) the usable abrasive to be reused in the cutting process,
  b) the mechanical particles of the size larger than the particles of the usable abrasive,
  c) the mechanical particles of the size smaller than the particles of the usable abrasive,
  d) dirty, turbid water.

This process is not energy demanding, it is mainly carried out simultaneously with the process of high pressure waterjet cutting. The reusable abrasive is from the screening unit conveyed into a water-permeable container, preferably a textile sack, the so-called 'bulk bag'. This container/bulk bag filled with wet abrasive is hung, preferably in the open air, for 1-5 days for the excess water to be displaced or trickle off.

After obtaining sufficient quantity, preferably about 1 ton, of reusable wet abrasive from the screening unit, it is possible to start the process of drying this wet abrasive.

The screened and sifted recycled material is stored in the storage tank for the wet abrasive and then it is taken by the screw conveyor to the drying oven. The screw conveyor regulates the quantity of the wet recycled abrasive taken from the storage tank according to the capacity of the drying oven and the moisture content of the wet abrasive so that the temperature in the oven is maintained at the range of about 130-180° C.

The drying unit consists of the storage tank for the wet abrasive with the screw conveyor connecting it with the drying oven, the drying blower, the fine dust extractor, the screening unit/separator, the storage tank for the dry screened recycled abrasive and the storage tank for the dry coarse waste.

The drying oven contains electric heating elements, inlet for air from the drying blower, temperature sensor, outlet for dry recycled material and inlet into the fine dust extractor which separates the dry fine dust and the clean air.

The drying oven is aerated with pre-heated air brought in by the drying blower, which keeps the abrasive afloat thereby speeding up the drying process. The same air stream conveys the particles of dry screened recycled abrasive through the outlet for the dry recycled abrasive from the drying oven to the output vibrating separator from which the dried abrasive material passes through the screen and falls into the storage tank; any larger particles formed in the drying oven due to high temperatures, which may cause "sintering" together the particles so they cannot pass through the screen, are conveyed into a small container for the waste material. It can be suitable to connect the drying oven to the fine dust extractor which will extract the residual dust in the screened recycled abrasive thereby ensuring the dust-free operation of the drying unit. The storage tank for screened recycled material is provided with a vault disrupter and drainage to remove the displaced waste water.

The primary requirement for operating the drying unit is to regulate batching of the abrasive depending on the temperature in the drying oven which is maintained preferably at the range of about 130-180° C. The temperature in the drying oven is reduced by adding wet abrasive and increased by switching on the heating elements while the speed of batching of the abrasive is adjusted according to decrease or increase of the temperature in the drying oven. If the temperature in the drying oven is high, the speed of batching is increased; if the temperature in the drying oven is low, the speed of batching is reduced while waiting until the abrasive in the oven becomes dry.

When starting the drying process, after switching the heating elements on for the first time the adjusting system is turned on. This system records the actual temperature in the drying oven measured by the temperature sensor and adjusts the speed of the screw conveyor and increases the intensity of batching. If the temperature in the drying oven exceeds the specified limit, heating elements are switched off and the intensity of batching is increased by a specified percentage step. If the temperature in the drying oven drops below a specified level, the batching process is turned off and the intensity of batching is reduced by a specified percentage step of the actual batching input; when the temperature again increases above the required level, the batching process is turned on.

As the system starts the adjusting process only after the heating elements are switched off for the first time, it removes the transient stage when the temperature in the oven rises to a high level despite continued adding of the very wet abrasive material (due to the presence of old dried abrasive). Without this step, the system would increase the speed of batching too soon.

3. During the next operation such as turning off the heating elements or turning off the batching process, the system will adjust the intensity of batching according to the last operation carried out:

|  | Actual operation | |
| --- | --- | --- |
| Adjusting speed of batching Last operation | Switching off heating elements | Turning off batching operation |
| Switching off heating elements | +specified operation | −last change/2 |
| Turning of batching operation | +last change/2 | −specified operation |

For Example:
3.1. If
a) the heating elements are switched off due to the increase of temperature, the intensity of batching is increased by applying a specified percentage step, and if
b) the heating elements are switched off next time due to the increase of temperature, the intensity of batching is increased by the same specified percentage step applied in the previous instance.
3.2. If
a) the heating elements are switched off due to the increase of temperature, the intensity of batching is increased by the same specified percentage step applied in the previous instance; but if
b) the heating elements are switched off due to the decrease of temperature, the intensity of batching is decreased by half of the specified percentage step applied in the previous case a).

It was found that the preferred specified percentage step was 5%.

4. As in the case of the continuous repeated adjustments of the intensity of batching this value gradually decreases to zero, there has been specified a limit below which any adjustment becomes inconsequential. At the point when the system is required to adjust the intensity of batching due to reaching the limit below which the adjustment becomes inconsequential, the whole adjusting process is restarted with the specified percentage step applied accordingly and the whole process continues operating as described in Section 3 above.

The primary requirement for operating the drying unit is to regulate batching of the abrasive according to the temperature in the drying oven. The control system continuously measures the current temperature and on the basis of this data it decides on the following:
switching the heating elements on or off—this control is based on the temperature hysteresis,
turning the batching process on or off—this control is based on the temperature hysteresis,
changing the intensity of batching of abrasive—subject to switching the heating elements or turning the batching process on or off.

The equipment is controlled by the programmable logic controller (PLC), which ensures continuous operation and minimizes the need for control by an operator.

According to the results of testing the adjusting process of the drying unit, average processing capacity of the equipment was 101.4 kg/hour of abrasive. Since at the start of the drying process the abrasive in the storage tank contains a greater proportion of water than at the end of the drying process, the storage tank has its own drainage system and the water is displaced from the stored wet abrasive.

The drying unit operates automatically and its output is the dry abrasive suitable for immediate use for abrasive waterjet cutting or which can be stored for the later use. The storage conditions for recycled abrasive are the same as for new, unused abrasive.

The drying process takes place in a drying oven, which can be operated separately or as part of the drying unit or the entire drying system for recycled abrasive.

The drying unit is operated intermittently—that is, it only make sense to start the drying process if there is sufficient quantity of the wet abrasive in the storage tank. Consequently, it is possible to join the operation of this equipment with the operation of the cutting table, because the drying unit does not require constant supervision, even if the storage tank is getting filled up with the screened wet recycled abrasive from an external source. The whole equipment is designed to be controlled automatically, this includes the signalling of operating, restricting and defective conditions.

An operator is therefore only required to remove the bulk bag with the dry recycled abrasive from under the output from the separator and put in a new, empty bulk bag. Where the recycled abrasive is brought from an external source, the operator—besides replacing the bulk bags, also fills the storage tank of the screw conveyor with wet abrasive. Depending in the local conditions, this operation should not take more than 5-15 minutes.

The control process is used in working cycles shown in FIGS. 4 and 5—the separation of cutting sludge, where batches of sludge going into the drying oven are exactly measured, and in the drying process (shown in FIG. 3) where the abrasive going into the drying oven is exactly measured so as to achieve the maximum efficiency of the drying process, i.e. to minimise the power consumption per unit weight of abrasive.

Using this method helps to increase the productivity of the specified recycling unit while greatly reducing the operating costs per unit weight of the recycled abrasive. This will allow this recycling unit to be used by also clients whose annual consumption of abrasive is relatively low. It will also disprove the long established view that recycling used abrasive is not economically viable. Finally, it will also help to significantly reduce the quantity of waste materials produced by machines working with high pressure abrasive waterjet.

This control process also allows to significantly speed up the recycling process and greatly reduce the energy consumption costs—by up to 300-400% compared with the current situation. Up to now the capacity of drying system was 0.4-3.5 kg of abrasive per minute.

EXAMPLES OF EXECUTION OF THE INVENTION

Example 1

The process of separating cutting sludge (FIGS. 4 and 5) is as follows:

From the trap 13 on the cutting table, the cutting sludge H is removed by means of a pumping unit in the sludge separating unit 14 to a screening unit 15 which consists of a vibrating separator 16 with steel screens or screens made from other materials of suitable mesh size depending on the required size of abrasive fraction which we want to obtain. The screening unit 15 will separate the cutting sludge H into the following groups:
 a) the usable abrasive to be reused in the cutting process,
 b) the mechanical particles of the size larger than the particles of the usable abrasive,
 c) the mechanical particles of the size smaller than the particles of the usable abrasive,
 d) dirty, turbid water.

This process is not energy demanding, it is mainly carried out simultaneously with the process of high pressure waterjet cutting. The reusable abrasive A is from the screening unit 15 conveyed into a suitable container, for example a bulk bag; the materials with different size of particles are taken to the other storage tanks depending on the type of their further use (for example, the material with smaller particles can be used for other purposes than abrasive waterjet cutting) or they are disposed of as waste materials.

After obtaining sufficient quantity, preferably about 1 ton, of reusable wet abrasive A from the screening unit 15 it is possible to start the process of drying this wet abrasive.

Example 2

Drying Unit for Recycled Material in Static Condition

Figure 1:
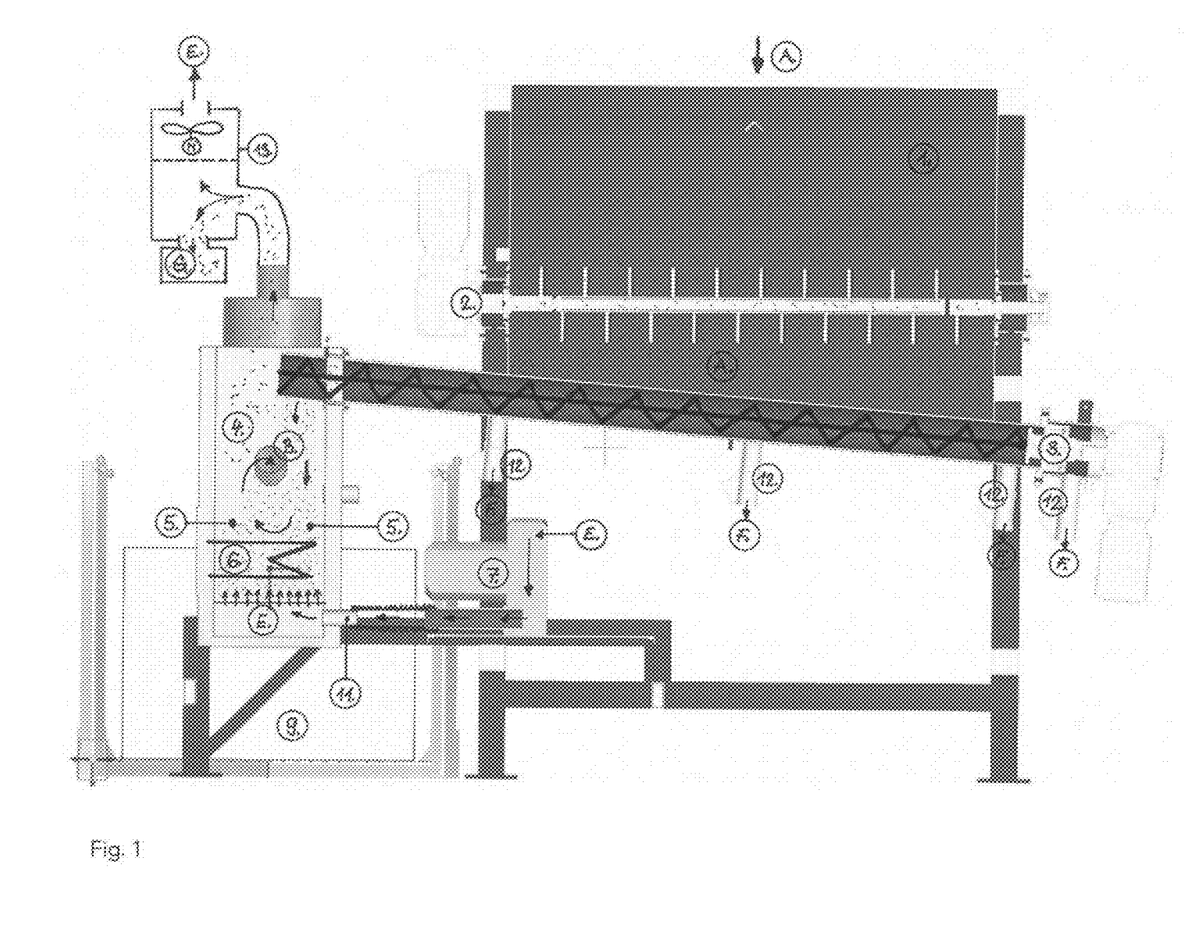
FIG. 1 Visualisation of the drying system, side view, in section
Figure 2:
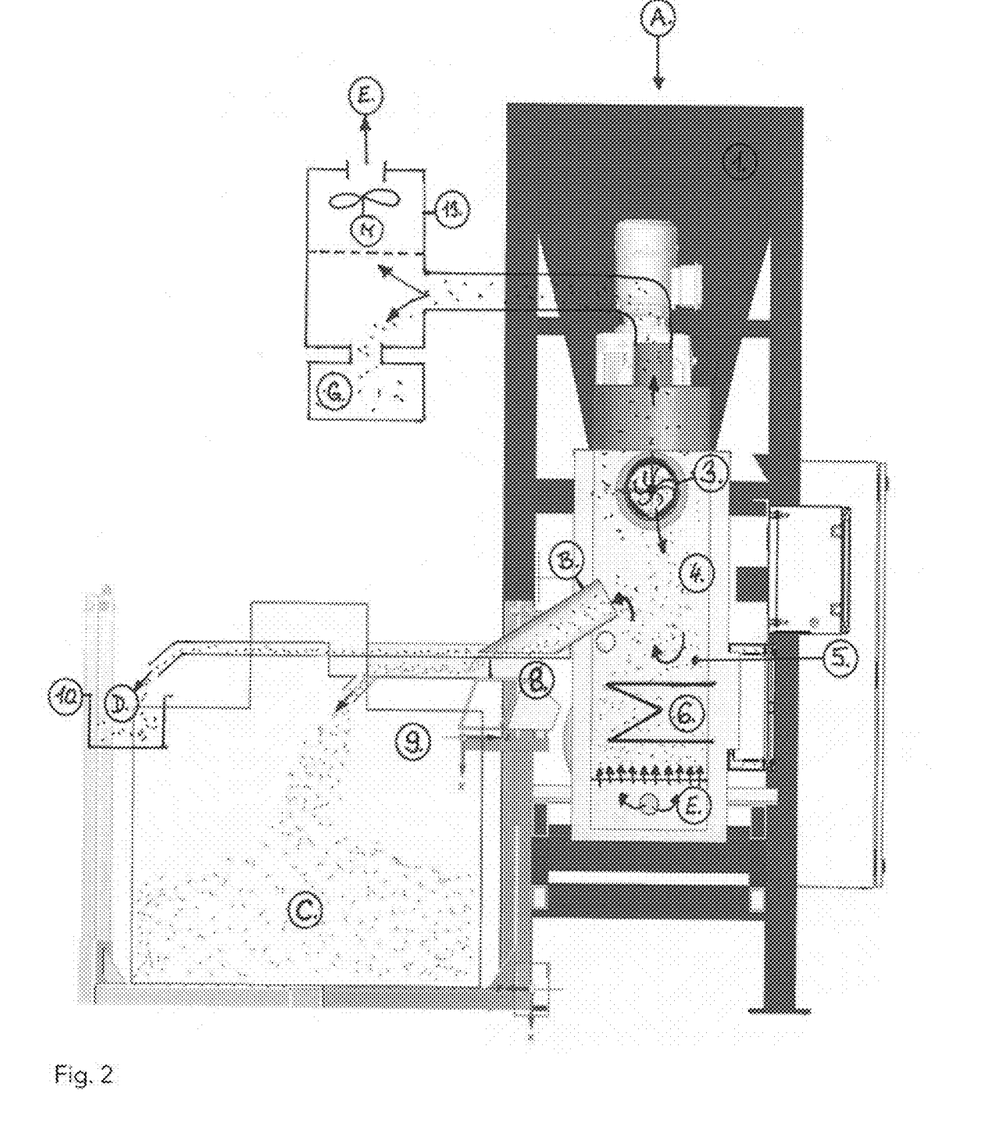
FIG. 2 Visualisation of the drying system, front view, in section
FIG. 3 Schematic diagram of the drying system
FIG. 4 Schematic diagram of the sludge separating system
FIG. 5 Schematic diagram of the separating process
FIG. 6 Table showing capacity of the drying system
FIG. 7 Graph showing capacity of the drying system
FIG. 8 Graph showing temperature in the drying oven in relation to the period of operation
Figure 3:
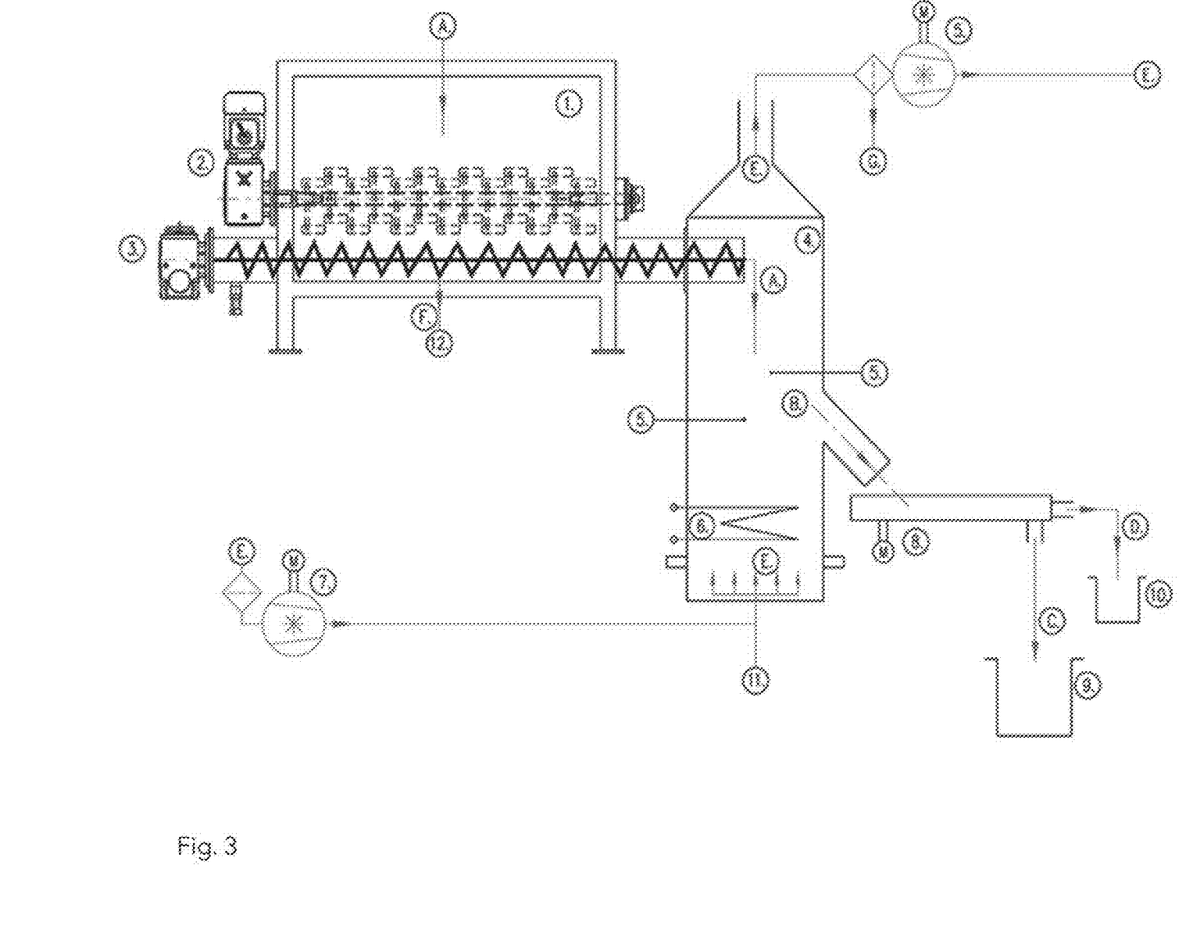

The drying unit for recycled material consisted of the storage tank 1 for wet abrasive with the screw conveyor 3 connecting it to the drying oven 4, the drying blower 7, the fine dust extractor 13 the vibrating separator 8, the bulk bag 2 for the dry screened recycled abrasive C and the container 10 for dry coarse waste D.

The screw conveyor 3 went into the drying oven 4 which contained electric heating elements 6, inlet for air from the drying blower 7, pressure sensor 11, temperature sensors 5, outlet for dry recycled material and outlet into the fine dust extractor 13 which separated the dry fine dust G and the clean air E.

The drying oven 4 was aerated with pre-heated air E brought in by the drying blower 7, which kept the abrasive A afloat thereby speeding up the drying process. The same stream of air E was conveying the particles of dry screened recycled abrasive C through the outlet B for dry recycled abrasive from the drying oven 4 to the output vibrating separator 8 from which the dried abrasive material was passing through the screen and falling into the storage tank 9 which was a 1000 kg bulk bag; any larger particles D formed in the drying oven 4 due to high temperatures, which may cause "sintering" together the particles of dry material, were conveyed into a small container 10 for the waste material. The drying oven 4 was also connected to the fine dust extractor 13 which was extracting the residual dust G from the screened recycled abrasive thereby ensuring the dust-free operation of the drying unit. The storage tank 1 for the screened recycled material was provided with the vault disrupter 2 and the drainage 12 to remove the displaced waste water F.

Example 3

Drying Process in the Drying Unit for the Recycled Abrasive

The storage tank for wet abrasive 1 was filled with the recycled abrasive, specifically the almandine garnet of Australian origin, weight 1000 kg, particles size 150-300 μm, 80 mesh.

1. The drying process was started, specifically the drying blower 7 of the drying oven 4 the transport blower, the output vibrating separator 8 and the heating elements 5. The system waited until the starting operating temperature, which was set to 150° C., was reached. When the set temperature was reached, the system started batching abrasive at the minimum specified intensity which was 0.4 kg per minute. When the temperature reached 160° C. the heating elements were switched off.

After introducing the first batches of abrasive, the temperature in the drying oven started decreasing; when the temperature dropped to 155° C., the heating elements were switched on again and when the temperature dropped again to 140° C., the batching of abrasive was turned off. The temperature then dropped to 138° C. As the abrasive was aerated and continued to warm up, it gradually started drying and the temperature in the oven started to rise and after 5 minutes the temperature rose to 170° C. As soon as the temperature rose to 150° C., the batching of abrasive was turned on again. When the temperature rose again to 160° C., the heating elements were switched off again.

2. After switching the heating elements on for the first time the adjusting system was turned on. This system adjusts the speed of the screw conveyor 3, thereby adjusting the intensity of batching. As the temperature in the drying oven exceeded the specified limit, i.e. 160° C., heating elements were switched off and the intensity of batching was increased by a specified percentage step, that is, by 5%. As soon as the temperature in the drying oven dropped below a specified level of 140° C., the batching process was turned off and the intensity of batching was reduced by a specified 5% of the actual batching input; when the temperature again rose above 150° C., the batching process was turned on.

As the system started the adjusting process only after the heating elements were switched off for the first time, it removed the transient stage when the temperature in the oven rises to over 160° C. despite continued adding of the very wet abrasive material (due to the presence of old dry abrasive). Without this step, the system would increase the intensity of batching too soon.

3. During the next operation such as turning off the heating elements or turning off the batching process, the system adjusted the intensity of batching according to the last operation carried out:

| | Actual operation | |
|---|---|---|
| Adjusting speed of batching Last operation | Switching off heating elements | Turning off batching operation |
| Switching off heating elements | +specified operation | −last change/2 |
| Turning of batching operation | +last change/2 | −specified operation |

Specifically, if:
a) the heating elements were switched off due to the increase of temperature to over 160° C., the intensity of batching was increased by 5% to 30.6 kg/hour, and
b) the heating elements were switched off next time due to the increase of temperature to over 160° C., the intensity of batching was increased by 5% of the value applied in step a) to 31.9 kg/hour,
c) the batching process was turned off due to the decrease of temperature, the intensity of batching was decreased by half of the value applied in step b) to 31.1 kg/hour, and
d) the batching process was turned off next time due to the decrease of temperature, the intensity of batching was decreased by 5% of the value applied in the last batching process to 29.6 kg/hour.

In general, the system was set up as follows:
if
the heating elements are switched off due to the increase of temperature, the intensity of batching will be increased by 5%, and in the next step the heating elements are switched off next time, the intensity of batching will be increased by 5% of the value applied in step a) above;
or, if
the heating elements are switched off due to the increase of temperature, the intensity of batching will be increased by 5%, of the value applied last time, and in the next step the batching process is turned off due to the decrease of temperature, the intensity of batching will be decreased by half of the 5% value applied in previous step.

4. As in the case of the continuous repeated adjustments of the intensity of batching this value gradually decreased to zero, there had been specified a limit (0.5%) below which any adjustment becomes inconsequential. At the point when the system was required to adjust the intensity of batching due to reaching the limit below which the adjustment becomes inconsequential, the whole adjusting process was restarted with the specified percentage step (5%) applied accordingly.

Description of Operation of the Drying Unit

The primary requirement for operating the drying unit is to regulate batching of the abrasive according to the temperature in the drying oven. The control system continuously measures the current temperature and on the basis of this data it decides on the following:
    switching the heating elements on or off—this control is based on the temperature hysteresis,
    turning the batching process on or off—this control is based on the temperature hysteresis,
    changing the intensity of batching of abrasive—subject to switching the heating elements or turning the batching process on or off.

Example 4

Cutting sludge H was pumped from the cutting table 20 onto a flat vibrating separator 16 which separated smaller and larger particles from the 80 mesh wet screened abrasive. From the vibrating separator 16 this wet abrasive 20 was falling into the textile bulk bag 17. When this bulk bag 17 was filled with the wet abrasive A, it was hung in the open air for 3 days for the excess water to be displaced or trickle off. The content of this bag was then poured into the storage tank 1 for the wet recycled abrasive A in the drying unit.

Example 5

Cutting sludge H was removed from the cutting table 20 and put into the storage tank 18 for cutting sludge H. After filling the storage tank 18 the cutting sludge H was conveyed by the screw conveyor onto the flat vibrating separator 16 which separated the 50 mesh wet screened abrasive into two fractions: the undersize fraction, which consisted of water I with fine waste and the oversize fraction, which contained the wet recycled abrasive A. The wet recycled abrasive A was conveyed into the bulk bag 17 and water I with fine waste was taken into the bulk bag 22. The content of this bag 7, which was the wet recycled abrasive A, was then poured into the storage tank 1 for the wet recycled abrasive A in the drying unit.

Example 6

The drying unit for recycled material consisted of the storage tank 1 for wet abrasive A with the screw conveyor 3 connecting it to the drying oven 4, the drying blower 2, the fine dust extractor 13 the vibrating separator 8, the bulk bag 9 for the dry screened recycled abrasive C and the container 10 for dry coarse waste D.

The screw conveyor 3 went into the drying oven 4 which contained electric heating elements 6, inlet for air from the drying blower 7, pressure sensor 11, temperature sensors 5, outlet for dry recycled material and outlet into the fine dust extractor 13 which separated the dry fine dust G and the clean air E.

The drying process was started, specifically the drying blower 7 of the drying oven 4, the transport blower, the output vibrating separator 8 and the heating elements 5. The system waited until the starting operating temperature, which was set to 150° C., was reached. When the set temperature was reached, the system started batching abrasive A into the drying oven 4 using the screw conveyor 3 at the minimum specified intensity, which was 0.4 kg per minute. When the temperature reached 160° C. the heating elements were switched off. After introducing the first batches of abrasive, the temperature in the drying oven started decreasing; when the temperature dropped to 155° C., the heating elements were switched on again and when the temperature dropped again to 140° C., the batching of abrasive was turned off. The temperature then dropped to 138° C. As the abrasive was aerated and continued to warm up, it gradually started drying and the temperature in the oven started to rise and after 5 minutes the temperature rose again to 170° C. As soon as the temperature rose to 150° C., the batching of abrasive was turned on again. When the temperature rose again to 160° C., the heating elements were switched off again. The drying oven 4 was aerated with pre-heated air E brought in by the drying blower 7, which kept the abrasive A afloat thereby speeding up the drying process.

After switching the heating elements on for the first time the adjusting system was turned on. This system adjusts the speed of the screw conveyor 3, thereby adjusting the intensity of batching. As the temperature in the drying oven exceeded the specified limit, i.e. 160° C., heating elements were switched off and the intensity of batching was increased by a specified percentage step, that is, by 5%. As soon as the temperature in the drying oven dropped below a specified level of 140° C., the batching process was turned off and the intensity of batching was reduced by a specified 5% of the actual batching input; when the temperature again rose above 150° C., the batching process was turned on As the system started the adjusting process only after the heating elements were switched off for the first time, it removed the transient stage when the temperature in the oven rises to over 160° C. despite continued adding of the very wet abrasive material (due to the presence of old dry abrasive). Without this step, the system would increase the intensity of batching too soon. During the next operation such as turning off the heating elements or turning off the batching process, the system adjusted the intensity of batching according to the last operation carried out:

|  | Actual operation | |
| --- | --- | --- |
| Adjusting speed of batching<br>Last operation | Switching off<br>heating elements | Turning off<br>batching operation |
| Switching off heating elements | +specified operation | −last change/2 |
| Turning of batching operation | +last change/2 | −specified operation |

The stream of air E was conveying the particles of dry screened recycled abrasive C through the outlet B for dry recycled abrasive from the drying oven 4 to the output vibrating separator 8 from which the dried abrasive material was passed through the screen and fell into the storage tank 9 which was a 1000 kg bulk bag; any larger particles D formed in the drying oven 4 due to high temperatures, which may cause "sintering" together the particles of dry material, were conveyed into a small container 10 for the waste material. The drying oven 4 was also connected to the fine dust extractor 13 which was extracting the residual dust G from the screened recycled abrasive thereby ensuring the dust-free operation of the drying unit. The storage tank 1 for the screened recycled material was provided with the vault disrupter 2 and the drainage 12 to remove the displaced waste water F.

LIST OF REFERENCE SYMBOLS

A. Wet screened recycled abrasive
B. Output of dry recycled abrasive from the drying oven
C. Dry screened recycled abrasive
D. Dry coarse waste
E. Air
F. Waste water
G. Dry fine waste
H. Cutting sludge
I. Water with fine waste
J. Clean water (for rinsing)
1. Storage tank for wet screened recycled abrasive
2. Vault disrupter
3. Screw conveyor
4. Drying oven
5. Temperature sensor
6. Heating elements
7. Drying blower
8. Output vibrating separator
9. Bulk bag for dry screened recycled abrasive
10. Container for dry coarse waste
11. Pressure sensor
12. Storage tank drainage
13. Fine dust extractor (with trap)
14. Sludge separating system for the cutting table
15. Screening unit
16. Vibrating separator
17. Bulk bag for wet screened recycled abrasive
18. Storage tank for cutting sludge
19. Vertical screw conveyor
20. Cutting table
21. Pump
22. Bulk bag for wet fine waste

INDUSTRIAL APPLICABILITY

High pressure waterjet cutting, accessories for CNC machines for the high pressure waterjet cutting. Recycling the abrasive materials used for the high pressure waterjet cutting.

The invention claimed is:

1. A method for recycling abrasive material used for high pressure waterjet cutting from cutting sludge is characterised by conveying the cutting sludge to a vibrating separator separating smaller and larger particles from the abrasive, then depositing of the abrasive into a water-permeable container (17); after displacing of excess water, putting a wet screened recycled abrasive (A) into a storage tank (1) for the wet screened recycled abrasive, conveying of the wet screened recycled abrasive by a screw conveyor (3) to a drying oven (4) which is heated by heating elements (6), aerated by a heated air (E); regulating a temperature in the oven by switching off and on said heating elements (6) and conveying an intensity of batching of the wet screened recycled abrasive (A) by the screw conveyor (3); conveying particles of a dry abrasive (C) through an outlet (B) for a dry recycled abrasive from the drying oven (4) to an output of vibrating separator (8), passing the dried abrasive material (C) from a vibrating separator (8) through a screen and putting into a storage container or a bulk bag (9) for the dry recycled abrasive (C).

2. The method for recycling abrasive material used for high pressure waterjet cutting from cutting sludge according to claim 1 is characterised by regulating the temperature in the oven (4) to stay in a range 130° C. to 170° C.

3. The method for recycling abrasive material used for high pressure waterjet cutting from cutting sludge according to claim 1 is characterised by switching off said heating elements (6) when the temperature in the oven (4) exceeds 160° C. and increasing the intensity of batching of the wet screened abrasive (A) at the same time by a specified step.

4. The method for recycling abrasive material used for high pressure waterjet cutting from cutting sludge according to claim 3 is characterised by switching on said heating elements (6) when the temperature in the oven (4) drops below 140° C. and reducing the intensity of batching of the wet screened abrasive (A) at the same time by a specified step.

5. The method for recycling abrasive material used for high pressure waterjet cutting from cutting sludge according to claim 3 is characterised in that the specified step is 5% of the actual batching intensity.

6. The method for recycling abrasive material used for high pressure waterjet cutting from cutting sludge according to claim 1 is characterised by connecting the drying oven (4) to a fine dust extractor (13) which extracts the residual dust (G).

7. The method for recycling abrasive material used for high pressure waterjet cutting from cutting sludge according to claim 1 is characterized removing displaced waste water (F) from the storage tank (1) by drainage (12).

8. The method for recycling abrasive material used for high pressure waterjet cutting from cutting sludge according to claim 1 is characterised by raking the wet screened abrasive in the storage tank (1) mechanically by the vault disrupter (2).

9. A drying unit for a recycled material for recycling abrasive material used for high pressure waterjet cutting from cutting sludge is characterised in that it consists of a storage tank (1) for a wet abrasive (A) with a screw conveyor (3) connecting into a drying oven (4), which contains at least one heating element (6), at least one temperature sensor (5), and in that it is provided with an inlet for bringing clean air (E) from a drying blower (7), an outlet (B) for a dry recycled materials (C), which is connected to a vibrating separator (8), and a space under a mesh screen of the vibrating separator (8) is connected to a container or a bulk bag (9) for the dry screened recycled abrasive (C).

10. The drying unit for the recycled material for recycling abrasive material used for high pressure waterjet cutting from cutting sludge according to claim 9 is characterised in that the drying oven (4) is connected to the fine dust extractor (13) separating dry fine dust (G) and clean air (E).

11. The drying unit according to claim 9 is characterised in that the storage tank (1) is provided with the vault disrupter (2) to remove displaced waste water (F).

12. The drying unit according to claim 9 is characterised in that the storage tank (1) is provided with drainage (12).

13. The drying unit according to claim 9 is characterised in that the space above the mesh screen of the vibrating separator (8) is connected to a container (10) for a dry waste (D).

14. A recycling unit for recycling abrasive material used for high pressure waterjet cutting from cutting sludge is characterised in that it consists of a flat vibrating separator (16) with a mesh screen with 3-4 mm openings and a mesh screen with 0.5-1 mm openings and an inlet for cutting sludge, and a space above the mesh screen with 0.5-1 mm openings of the flat vibrating separator (16) is connected to a container or a bulk bag (17) for a wet screened recycled abrasive (A) and a space under the mesh screen with 0.5-1 mm openings of the flat vibrating separator (16) is used for discharging water (I) with fine waste.

\* \* \* \* \*